(12) United States Patent
Simon

(10) Patent No.: US 6,791,732 B2
(45) Date of Patent: Sep. 14, 2004

(54) SYSTEMS AND METHODS FOR ALTERING THE PROPAGATION OF OPTICAL SIGNALS WITHIN OPTICAL MEDIA

(75) Inventor: Jonathan Simon, Castro Valley, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 85 days.

(21) Appl. No.: 10/176,864

(22) Filed: Jun. 20, 2002

(65) Prior Publication Data

US 2003/0234972 A1 Dec. 25, 2003

(51) Int. Cl.[7] ............................ G02F 1/01; G02F 1/00; G02B 6/26; H01Q 15/02; H01L 31/00
(52) U.S. Cl. .................. 359/237; 359/240; 359/241; 359/298; 359/321; 359/322; 359/332; 385/14; 385/15; 385/40; 385/42; 343/909; 343/786; 343/787; 250/214.1
(58) Field of Search ................. 385/8, 40, 42, 385/129, 14, 15, 9; 343/909, 772, 786, 787; 250/214.1; 359/237, 240, 241, 298, 321, 322, 326, 332, 344, 361, 238

(56) References Cited

U.S. PATENT DOCUMENTS

| | | | |
|---|---|---|---|
| 5,389,943 A | | 2/1995 | Brommer et al. |
| 5,784,400 A | | 7/1998 | Joannopoulos et al. |
| 5,973,823 A | * | 10/1999 | Koops et al. ............... 359/322 |
| 5,998,298 A | | 12/1999 | Fleming et al. |
| 5,999,308 A | * | 12/1999 | Nelson ....................... 359/321 |
| 6,064,506 A | * | 5/2000 | Koops ........................ 359/237 |
| 6,278,105 B1 | * | 8/2001 | Mattia ..................... 250/214.1 |
| 6,483,640 B1 | * | 11/2002 | Tonucci et al. ............. 359/361 |
| 6,522,448 B2 | * | 2/2003 | Baba et al. ................. 359/241 |
| 2002/0048422 A1 | | 4/2002 | Cotteverte et al. |

* cited by examiner

Primary Examiner—Loha Ben

(57) ABSTRACT

Optical modulators are provided. A representative optical modulator includes an optical medium that is adapted to propagate optical signals. An array of lattice sites are arranged in the optical medium, with at least some of the lattice sites exhibiting lower refractive indexes than the refractive index of the optical medium. Preferably, a first of the lattice sites incorporates a first optical component that is moveable relative to the optical medium. By moving the first optical component relative to the optical medium, a propagation characteristic of the optical medium can be altered. Optical systems, methods and other optical modulators also are provided.

17 Claims, 5 Drawing Sheets

SYSTEMS AND METHODS FOR ALTERING THE PROPAGATION OF OPTICAL SIGNALS WITHIN OPTICAL MEDIA

FIELD OF THE INVENTION

The present invention generally relates to optics. In particular, the invention relates to systems and methods that involve the use of moveable optical components for altering the propagation of signals through optical media.

DESCRIPTION OF THE RELATED ART

The desire for increasing data-handling capacity of communication systems has resulted in a trend toward using optical communication systems. In a typical optical communication system, input electrical signals are provided to a driver that controls an optical source. Optical signals generated by the optical source then are routed through various optical transmission media, such as optical fibers. Ultimately, the optical signals are converted to output electrical signals for use at their intended destination.

Oftentimes, routing of optical signals includes converting the optical signals to electrical signals and then redirecting the electrical signals. For instance, electrical packet switches can be used to direct electrical signals corresponding to multiple inputs to selected switch outputs. The redirected electrical signals then are converted to optical signals for further propagation.

For various reasons, it is desirable to maintain optical signals propagated via an optical communications system in the optical domain. For example, converting the optical signals to electrical signals, and then back again, oftentimes results in signal losses and/or distortions. Unfortunately, it has proven difficult to develop optical components, such as optical switches, that can be used to manipulate optical signals in the optical domain. In particular, providing optical components that are compact, capable of high-speed data transmission and/or relatively low-loss has been difficult. Thus, it should be appreciated that there is a need for systems and methods that address the aforementioned and/or other perceived shortcomings of the prior art.

SUMMARY OF THE INVENTION

The present invention generally relates to the use of moveable optical components for altering the propagation of optical signals through optical media. More specifically, the moveable optical components are associated with lattice sites of optical media and influence propagation characteristics of optical transmission paths formed in the optical media. In particular, by moving at least one of the optical components relative to the optical medium in which it is arranged, at least a first propagation characteristic of the optical medium can be altered.

An optical modulator in accordance with the present invention includes an optical medium that propagates optical signals. An array of lattice sites are arranged in the optical medium, with at least some of the lattice sites exhibiting refractive indexes that are different than the refractive index of the optical medium. At least a first of the lattice sites incorporates a first optical component that is moveable relative to the optical medium. By moving the first optical component relative to the optical medium, a propagation characteristic of the optical medium can be altered.

A method for modulating optical signals in accordance with the invention includes: providing an optical medium having an array of lattice sites, at least some of the lattice sites exhibiting refractive indexes that are different than the refractive index of the optical medium, a first of the lattice sites including a first optical component operative to influence propagation of optical signals propagating through the optical medium; and moving the first optical component relative to the optical medium to alter at least a first propagation characteristic of the optical medium.

Additionally, other devices, systems and methods of the present invention will be or may become apparent to one with skill in the art upon examination of the following drawings and detailed description. It is intended that all such additional devices, systems, methods, features, and/or advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail here, systems and methods in accordance with the present invention involve the use of optical modulators for altering the propagation of optical signals. In particular, an optical modulator in accordance with the invention incorporates an optical medium that optically communicates with at least one moveable optical component. By moving the optical component relative to the optical medium, an optical path defined by the optical medium can be altered so that selective modulation of an optical signal propagating through the optical medium is achieved.

Figure 1:
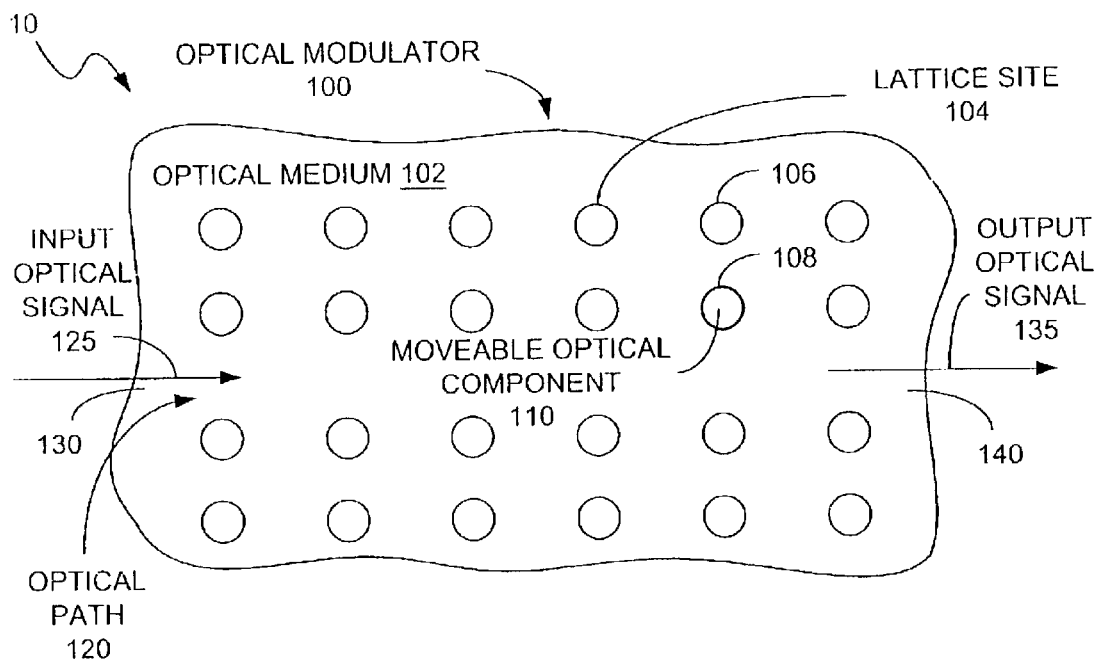
FIG. 1 is a schematic diagram of an embodiment of an optical system in accordance with the present invention.

Referring now to the drawings, FIG. 1 is a schematic diagram depicting an optical system 10 in accordance with the present invention. Optical system 10 includes an optical modulator 100, only a portion of which is shown for ease of description. Optical modulator 100 includes an optical medium 102 within which multiple lattice sites, e.g., sites 104, 106 and 108, are located. Generally, each of the lattice sites is formed of a material exhibiting a different refractive index, e.g., a lower refractive index, than the material forming the optical medium.

At least one of the lattice sites, e.g., site 108, includes a moveable optical component 110 that can move relative to the optical medium. More specifically, the optical component can be moved selectively between a first position (depicted in FIG. 1), in which the optical component optically communicates with the optical medium, and a second position, in which the optical component alters a propagation characteristic of the optical modulator. By way of example, the second position may be selected so that the optical component no longer optically communicates with the optical medium. In other embodiments, the second position may be selected so that only a portion of the optical component no longer communicates optically with the optical medium.

The optical medium and lattice sites define an optical path, e.g., optical path 120. Optical path 120 receives an input optical signal 125 at a first location 130 of the optical modulator and provides an output optical signal 135 at a second location 140. The lattice sites are arranged so that a photonic bandgap exists for the propagation of optical signals in directions parallel to the planar extent of the optical medium. This bandgap facilitates the transmission of the optical signal along the optical path defined by the lattice sites. Note, the optical path propagates the optical signal from the first location to the second location when the optical component is moved to the first position.

Figure 2:
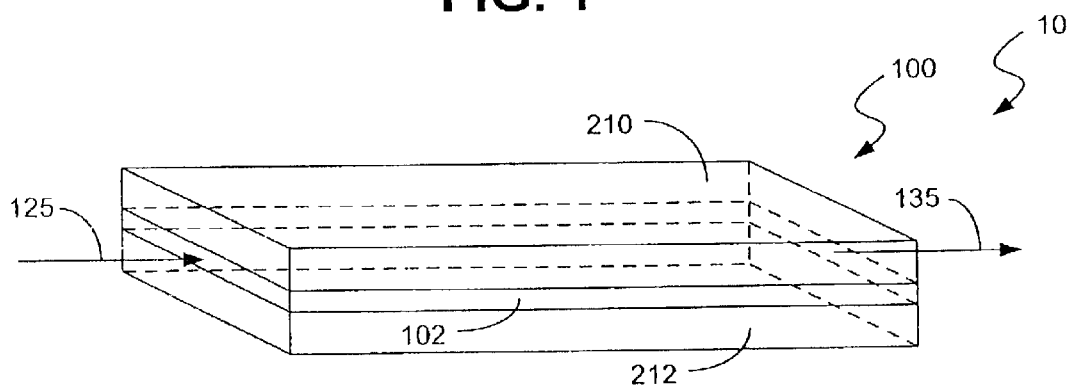
FIG. 2 is a schematic diagram of an embodiment of an optical modulator in accordance with the present invention.

As shown in FIG. 2, the optical medium 102 is sandwiched between first and second substrates 210 and 212, respectively. Each of the substrates exhibits a lower refractive index than the bulk properties of the optical medium. This enables the optical signal to be confined to the planar extent of the optical medium. More specifically, the optical signal is confined in directions normal to the plane of the optical medium by guidance from internal reflections at the interfaces between the substrates and the optical medium.

Figure 3:
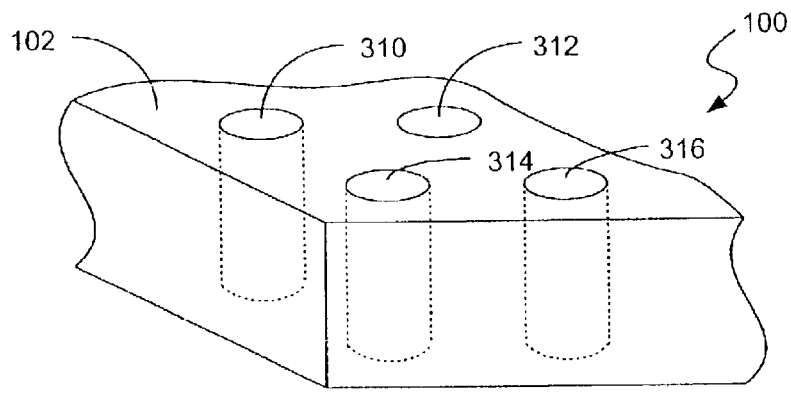
FIG. 3 is a schematic diagram of several lattice sites of the optical modulator of FIG. 2.

As depicted in FIG. 3, each lattice site includes an optical component, e.g., components 310, 312, 314 and 316, respectively. The optical components are generally formed of cylindrical columns of material. Interaction of an optical signal with the interfaces formed between the optical components and the optical medium influences propagation of optical signals received by the optical modulator. For instance, in the embodiment of FIG. 1, interaction of the refractive indices of the various materials promotes propagation of the input optical signal along optical path 120.

The optical components of the lattice sites of FIG. 3 are arranged in a two-dimensional, square configuration. However, other configurations also can be used, including one-dimensional, three-dimensional, rectangular, circular, curved, linear and/or irregular configurations. Additionally, the lattice sites can be arranged to form one or more optical transmission paths in an optical medium, each of which can be provided in various configurations.

Figure 4:
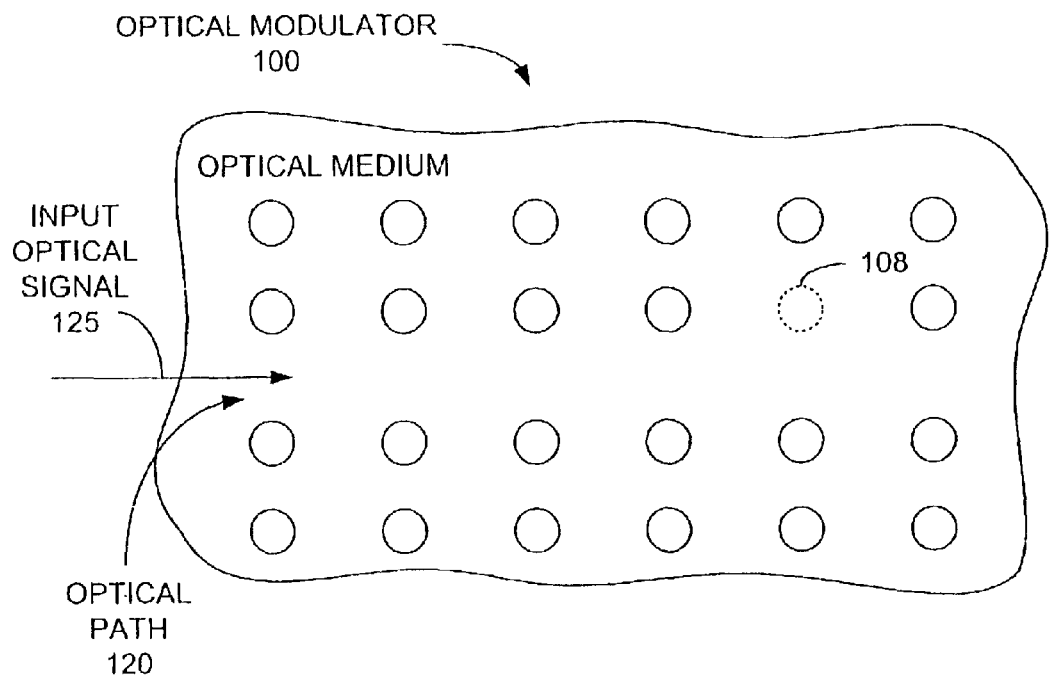
FIG. 4 is a schematic diagram of the optical system of FIG. 1.

In FIG. 4, the moveable optical component associated with the lattice site 108 has been moved to a second position. In particular, the optical component has been moved so that at least a portion of the optical component no longer optically communicates with the optical medium 102. Repositioning the moveable optical component alters at least one propagation characteristic of the optical modulator. For instance, the propagation path of the optical modulator and/or the amplitude and/or wavelength of an optical signal propagated by the optical modulator can be altered. By way of example, in the embodiment of FIG. 4, the input optical signal 125 is prevented from propagating beyond the optical modulator. Thus, the embodiment of FIG. 4 operates as an optical switch.

Figure 5:
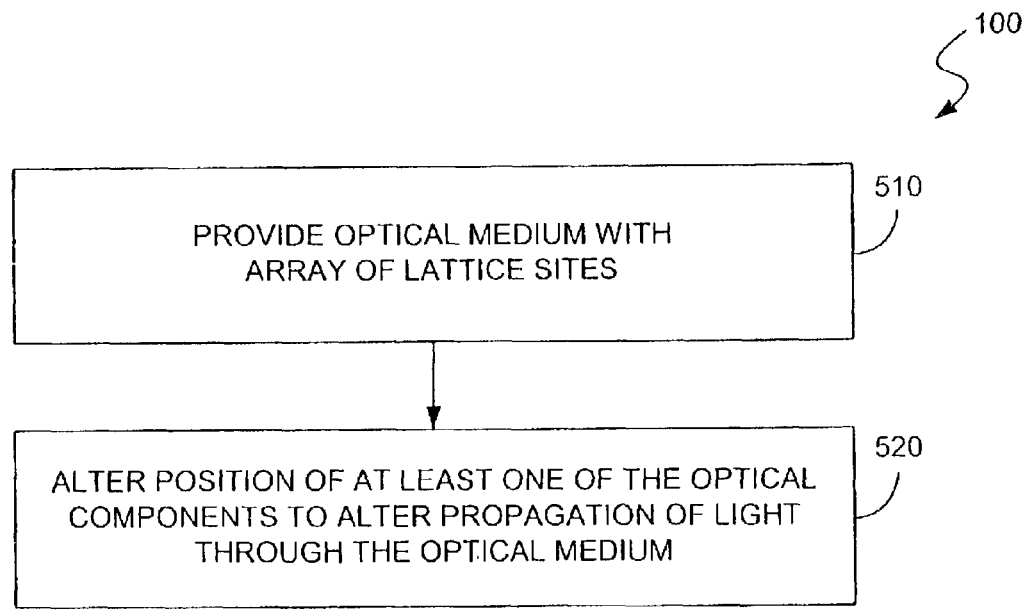
FIG. 5 is flowchart depicting functionality of the optical modulator of FIG. 1.

FIG. 5 is a flowchart depicting functionality of the embodiment of the optical modulator depicted in FIGS. 1 and 4. As shown in FIG. 5, the functionality (or method) 100 may be construed as beginning at block 510, where an optical medium with an array of lattice sites is provided. In particular, each of the lattice sites can be associated with an optical component that exhibits a refractive index that is different than that of the optical medium. In block 520, the position of at least one of the optical components is altered. More specifically, the optical component(s) can be repositioned to alter propagation of light through the optical medium.

As mentioned before, at least one of the optical components and the optical medium of an optical modulator in accordance with the invention are moveable relative to each other. For instance, an optical component can move while the optical medium remains stationary. Additionally or alternatively, the optical medium could move while one or more of the optical components remain stationary.

Figure 6:
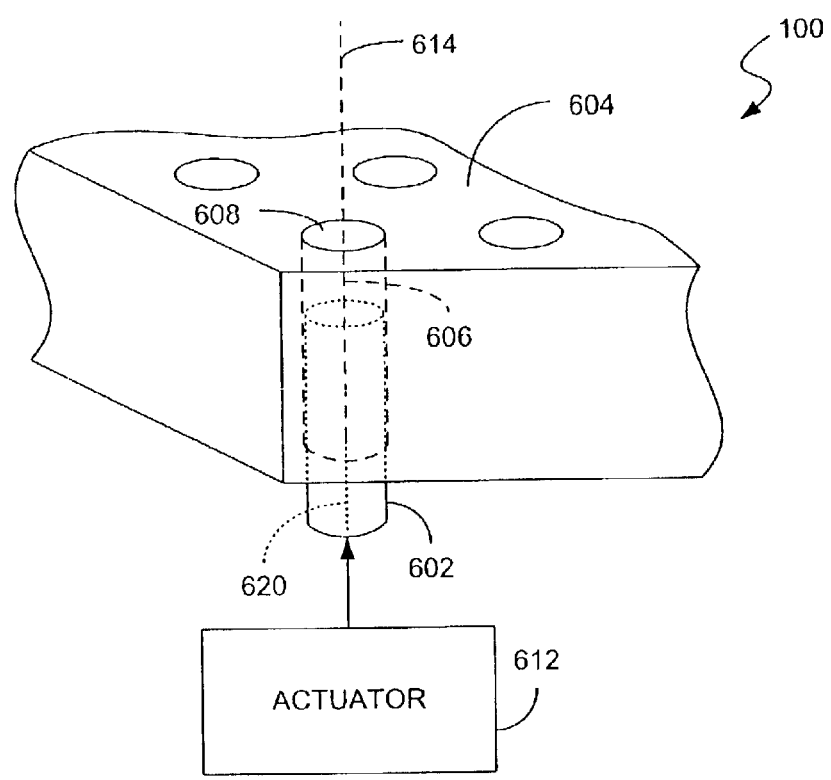
FIG. 6 is a schematic diagram of several lattice sites of an embodiment of an optical modulator in accordance with the invention.

In the embodiment of FIG. 6, the optical modulator 100 includes a moveable optical component 602 and an optical medium 604. The optical medium includes a cavity 606 located at a lattice site 608. The cavity is sized and shaped to receive at least a portion of optical component 602. Optical component 602 is formed as a column of material, e.g., a dielectric material, exhibiting a different refractive index than that of the bulk properties of the optical medium.

An actuator 612 moves the optical component 602, e.g., moves the optical component into and/or out of the cavity. Optical component 602 is translatable within the cavity along an axis 614 of the cavity. Note, axis 614 of the cavity and longitudinal axis 620 of the optical component of FIG. 6 are oriented substantially parallel to each other. In other embodiments, the axes may not be substantially parallel.

Note, in addition to mechanical actuation, such as by actuator 612, other sources of actuation could be used. Furthermore, the actuation does not necessarily need to be reversible. For example, an optical component could be moved until the optical properties of the optical modulator are appropriately tuned. Once tuned, the optical component could be temporarily or permanently maintained in position.

In some embodiments, an optical component can rotate within a cavity. In such an embodiment, the optical properties of the optical component may vary about its circumference so that rotation of the optical component changes at least a first propagation characteristic of the optical modulator. In other embodiments, optical properties of an optical component can vary along the length of the component and/or along the direction of movement of the optical component. An example of this feature is depicted in FIG. 7.

Figure 7:
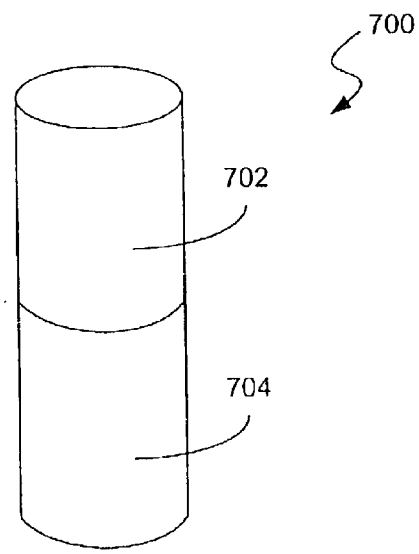
FIG. 7 is a schematic diagram of another embodiment of a moveable optical component in accordance with the invention.

As shown in FIG. 7, optical component 700 includes multiple sections, e.g., section 702 and 704. Each of these sections exhibits different optical properties. By way of example, section 702 exhibits a refractive index that is lower than the refractive index exhibited by the material of section 704.

Figure 8:
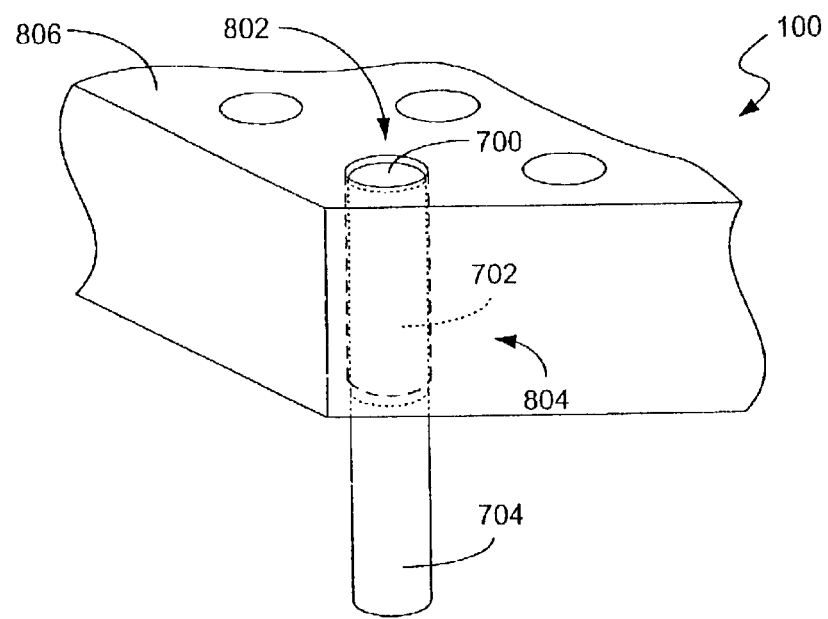
FIG. 8 is a schematic diagram of several lattice sites of another embodiment of an optical modulator in accordance with the invention.

As shown in FIG. 8, optical component 700 can be inserted within a cavity 802 located at a lattice site. In particular, the optical component is arranged in a first position 804 so that at least a portion of section 702 optical communicates with optical medium 806. By being arranged in the first position, the optical modulator exhibits a first set of propagation characteristics.

Figure 9:
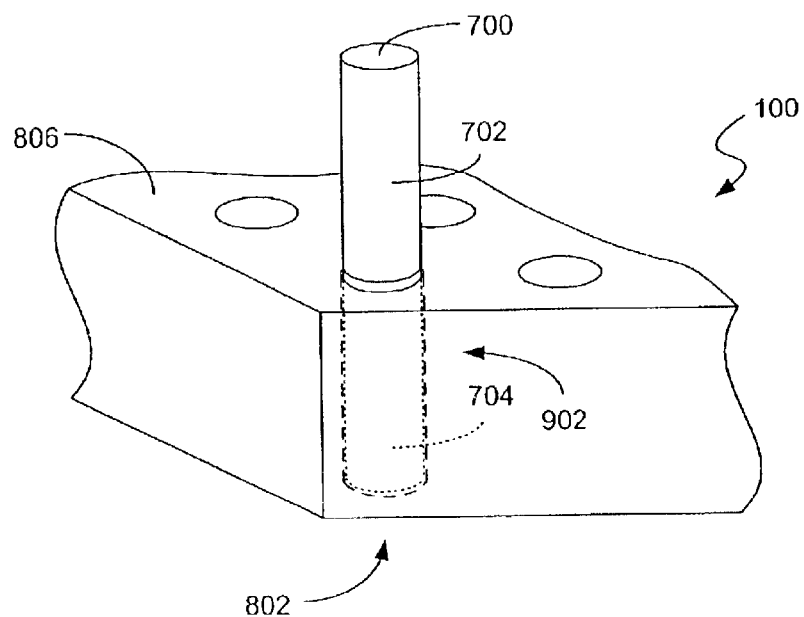
FIG. 9 is a schematic diagram of several lattice sites of another embodiment of an optical modulator in accordance with the invention.

In contrast, moving the optical component 700 to a second position 902 (FIG. 9) causes the optical modulator to exhibit a second set of optical characteristics. In particular, the second position 902 corresponds to at least a portion of the section 704 optically communicating with the optical medium 806. Note, in some embodiments, the second position could include a portion of section 704 and a portion of section 702 optically communicating with the optical medium.

In some embodiments, at least a third position of the optical component is provided. By way of example, such a third position could correspond to the optical component not optically communicating with the optical medium. Clearly, various other positions could be used depending upon the propagation characteristics desired to be exhibited by the optical modulator.

Figure 10:
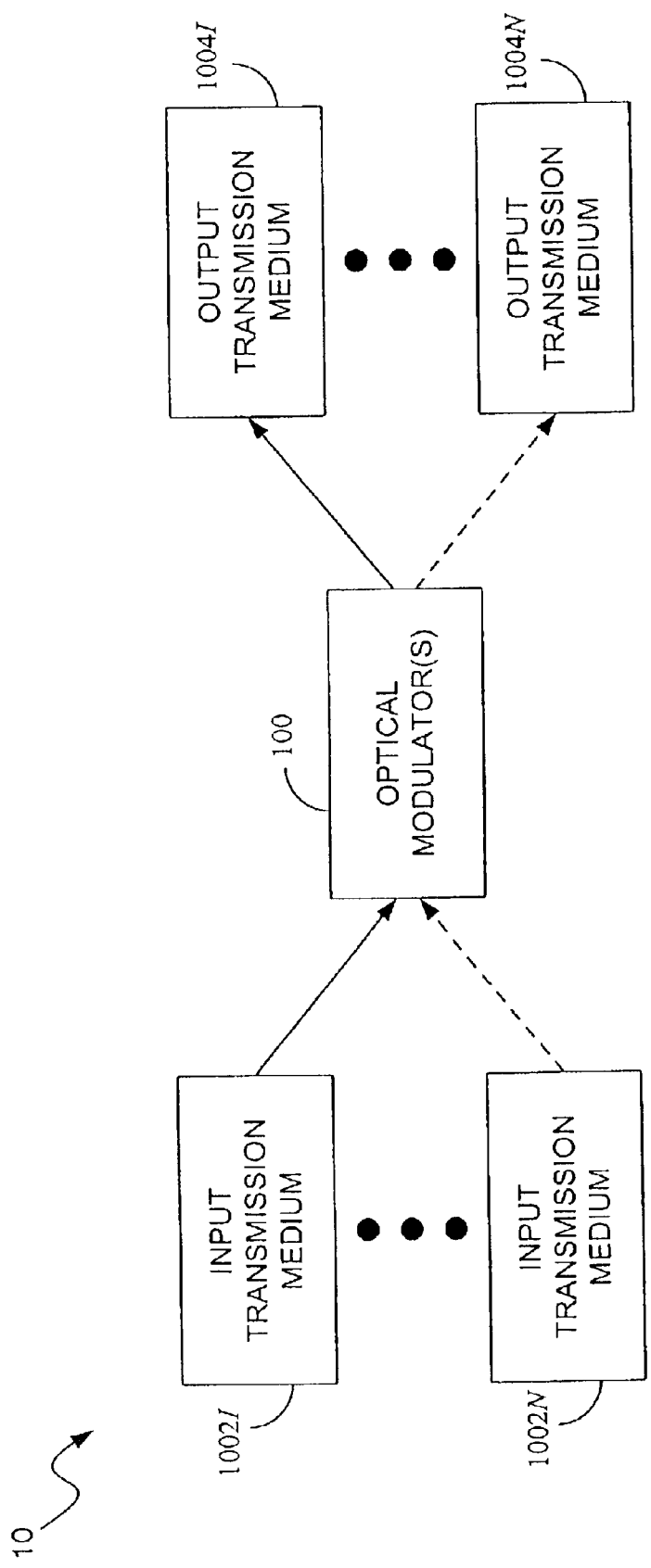
FIG. 10 is a schematic diagram of another embodiment of an optical system in accordance with the invention.

Another embodiment of an optical system 10 is depicted schematically in FIG. 10. As shown in FIG. 10, at least one optical modulator 100 is provided that optically communicates with input transmission media, e.g., media 1002i–1002n, and output transmission media, e.g., media 1004i–1004n. It should be appreciated that optical system 10 of FIG. 10 could be adapted for various uses within which one or more optical signals are to be received, altered, and then selectively provided to one or more output transmission media for further propagation. Thus, the optical modulator can be configured as an optical matrix switch.

For more information on photonic crystals, see, for example, U.S. Pat. No. 6,175,671 to Roberts, which is incorporated herein by reference. *J. D. Joannopoulous* et al., "Photonic Crystals: Moulding the Flow of Light," Chapter 5 (Princeton University Press, 1995); U.S. Pat. No. 5,651,818 to Milstein et al.; U.S. Pat. No. 5,998,298 to Fleming et al.; U.S. Pat. No. 5,784,400 to Joannopoulous et al.; and U.S. Pat. No. 5,389,943 to Brommer et al., also are incorporated by reference.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to illustrate the principles of the invention and its practical application to thereby enable one of ordinary skill in the art to utilize the invention in various embodiments and with various modifications as are suited to the particular use contemplated.

For instance, in some embodiments, optical components can be formed in shapes other than cylindrical. By way of example, semicircular and/or rectangular could be used. Similarly, non-columnar shapes, such as spherical, semispherical discs, rectangular, and/or other planar and non-planar shapes could be used in some embodiments. All such modifications and variations are within the scope of the invention as determined by the appended claims when interpreted in accordance with the breadth to which they are fairly and legally entitled.

What is claimed is:

1. An optical system for propagating optical signals, said optical system comprising:

an optical modulator having an optical medium and an array of lattice sites, the optical medium being operative to propagate optical signals, the array of lattice sites being located in the optical medium, at least some of the lattice sites exhibiting refractive indexes different than the refractive index of the optical medium, a first of the lattice sites including a first optical component moveable relative to the optical medium such that moving the first optical component relative to the optical medium alters propagation of optical signals through the optical medium.

2. The optical system of claim 1, wherein the array of lattice sites defines a first optical path through at least a portion of the optical medium;

wherein the first optical component is moveable between a first position and a second position; and wherein, in the first position, the first optical component prevents at least a portion of the optical signals from propagating along an entirety of the first optical path.

3. The optical system of claim 2, wherein, in the first position, the first optical component filters the optical signals such that at least a select frequency of light of the optical signals is prevented from propagating along the entirety of the first optical path.

4. The optical system of claim 2, wherein the array of lattice sites defines a second optical path through at least a portion of the optical medium; and wherein, in the first position, the first optical component redirects at least said portion of the optical signals to propagate along the second optical path.

5. The optical system of claim 2, wherein, in the second position, the first optical component enables the optical signals to propagate along the entirety of the first optical path.

6. The optical system of claim 1, wherein the refractive index of the first optical component varies with respect to a direction of movement of the first optical component relative to the optical medium.

7. The optical system of claim 6, wherein the first optical component is moveable between a first position and a second position; and wherein the first optical component includes at least a first portion exhibiting a first refractive index and a second portion exhibiting a second refractive index different than the first refractive index, the first portion being sized and shaped such that, when the first optical component is moved to the first position, the second refractive index does not influence propagation of optical signals through the optical medium.

8. The optical system of claim 1, further comprising:

an actuator operatively arranged to move the first optical component relative to the optical medium.

9. The modulator recited in claim 1, wherein the optical medium is substantially planar in shape.

10. The optical system of claim 1, further comprising:

a first optical transmission media arranged to communicate optical signals to the optical modulator.

11. The optical system of claim 10, further comprising:

a second optical transmission media arranged to receive optical signals from the optical modulator.

12. The optical system of claim 1, wherein the first optical component defines an axis; and wherein propagation of optical signals through the optical medium is influenced by translating the first optical component along the axis.

13. A method for modulating optical signals, said method comprising:

providing an optical medium operative to propagate optical signals, the optical medium having an array of lattice sites arranged therein, at least some of the lattice sites exhibiting lower refractive indexes than the refractive index of the optical medium, a first of the lattice sites including a first optical component operative to influence propagation of optical signals through the optical medium; and moving the first optical component and the optical medium relative to each other to alter the propagation of the optical signals through the optical medium.

14. The method of claim 13, wherein moving the first optical component and the optical medium includes moving the first optical component.

15. The method of claim 13, wherein moving the first optical component and the optical medium includes moving the optical medium.

16. The method of claim 13, further comprising:

receiving an optical signal at the optical medium.

17. The method of claim 16, further comprising:

selectively redirecting the optical signal received.

* * * * *